(12) United States Patent
Deo et al.

(10) Patent No.: US 8,382,120 B2
(45) Date of Patent: Feb. 26, 2013

(54) METHOD AND APPARATUS FOR COMPLIANT PLATE SEALS

(75) Inventors: Hrishikesh Vishvas Deo, Saratoga Springs, NY (US); Norman Arnold Turnquist, Sloansvile, NY (US); Farshad Ghasripoor, Glenville, NY (US); William Edward Adis, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 44 days.

(21) Appl. No.: 12/873,118

(22) Filed: Aug. 31, 2010

(65) Prior Publication Data
US 2012/0049461 A1    Mar. 1, 2012

(51) Int. Cl.
*F16J 15/44* (2006.01)
(52) U.S. Cl. .................................................... 277/355
(58) Field of Classification Search ............... 277/355
See application file for complete search history.

(56) References Cited

U.S. PATENT DOCUMENTS

| | | | |
|---|---|---|---|
| 5,568,931 A * | 10/1996 | Tseng et al. ................. 277/355 |
| 5,688,105 A * | 11/1997 | Hoffelner ................... 415/170.1 |
| 6,077,038 A * | 6/2000 | Gail et al. ..................... 415/229 |
| 6,267,381 B1 | 7/2001 | Wright |
| 6,343,792 B1 | 2/2002 | Shinohara et al. |
| 6,612,581 B2 | 9/2003 | Bhate et al. |
| 6,644,668 B1 * | 11/2003 | Albers et al. ................. 277/355 |
| 6,655,692 B2 * | 12/2003 | Kono ............................ 277/355 |
| 6,880,829 B1 | 4/2005 | Datta |
| 7,066,468 B2 * | 6/2006 | Uehara et al. ................. 277/355 |
| 7,118,327 B2 | 10/2006 | Doering et al. |
| 7,419,164 B2 | 9/2008 | Awtar et al. |
| 7,651,101 B2 | 1/2010 | Awtar et al. |
| 2004/0018085 A1 * | 1/2004 | Dhar et al. .................. 415/174.2 |
| 2008/0042366 A1 * | 2/2008 | Awtar et al. ..................... 277/411 |
| 2008/0131269 A1 * | 6/2008 | Deo et al. .................... 415/170.1 |
| 2010/0143102 A1 | 6/2010 | Deo et al. |

OTHER PUBLICATIONS

Renninger, J., "Understanding Damping Techniques for Noise and Vibration Control;" http://supersheet.com/pdfs/engineering/understandingdamping.pdf; Nov. 2000; (8 pages).

Lakes, R.S., "High Damping Composite Materials: Effect of Structural Hierarchy;" http://silver.neep.wisc.edu/~lakes/VEHierCmp.pdf; Mar. 16, 2001; pp. 287-297 (11 pages).

Gallimore, C., "Passive Viscoelastic Constrained Layer Damping Application for a Small Aircraft Landing Gear System," http://scholar.lib.vt.edu/theses/available/etd-10102008-124400/unrestricted/Theses_CraigGallimore_Rev1.pdf; Sep. 30, 2008, (117 pages).

"The Damping Strip;" http://www.damping.com/the_damping_strip.php; last accessed Dec. 6, 2010 (3 pages).

* cited by examiner

*Primary Examiner* — Vishal Patel
(74) *Attorney, Agent, or Firm* — Ann. M. Agosti

(57) ABSTRACT

A seal assembly for a turbomachine includes a plurality of compliant plate members attached to an interior surface of a stationary housing. The compliant plate members define a sealing ring between the stationary housing and a rotor. Each of the compliant plate members comprises at least one slot therein. The seal assembly further includes at least one arcuate static ring attached to the interior surface of the stationary housing and extending radially into the at least one slot in the compliant plate members. Each of the at least one static ring extends circumferentially through and between a plurality of the compliant plate members. Finally, the seal assembly includes a vibration damper disposed adjacent to or provided on the plurality of compliant plate members. The vibration damper is configured to dampen vibration of the plurality of compliant plate members.

4 Claims, 16 Drawing Sheets

METHOD AND APPARATUS FOR COMPLIANT PLATE SEALS

BACKGROUND OF THE INVENTION

The subject matter disclosed herein relates to the field of seals used in turbomachinery. More particularly, the subject matter disclosed herein relates to a method and apparatus for dampening vibration of a compliant plate seal for application at the interface of a rotating component, such as a rotor in a turbine or compressor, and a stationary component, such as a casing or stator.

Dynamic sealing between the rotating component and the stationary component is an important concern in turbomachinery. Several methods of sealing have been used. In particular, sealing based on flexible members has been used that includes seal members, such as compliant plate seals and/or brush seals. Brush seals typically include tightly-packed, generally cylindrical bristles that are arranged in a staggered arrangement to reduce leakage. The bristles have a low radial stiffness that allows them to move in the event of a rotor excursion, while maintaining a tight clearance during steady state operations. Brush seals, however, are generally effective only below a limited pressure differential across the seal. Because of the generally cylindrical geometry of the bristles, the brush seals tend to have a low stiffness in the axial direction, which limits the maximum operable pressure differential in known brush seals.

In contrast, at least some known compliant plate seals have a plate-like geometry that has a significantly higher axial stiffness for a comparable radial stiffness and therefore, such seals have the capability of being used with larger pressure differentials than known brush seals. However, compliant plate seals may experience axial leakage between adjacent compliant plates, which may cause flow-induced vibrations or flutter of the compliant plates. Such vibration may reduce the lifespan of the compliant plates.

BRIEF DESCRIPTION OF THE INVENTION

In a first embodiment, a turbomachine includes a stationary housing and a rotor rotating about an axis. A seal assembly for the turbomachine includes a plurality of compliant plate members attached to an interior surface of the stationary housing. The compliant plate members define a sealing ring between the stationary housing and the rotor. Each of the compliant plate members comprises at least one slot therein. The seal assembly further includes at least one arcuate static ring attached to the interior surface of the stationary housing and extending radially into the at least one slot in the compliant plate members. Each of the at least one static ring extends circumferentially through and between a plurality of the compliant plate members, such that the at least one static ring serves as a barrier to at least some axial leakage flow between the compliant plate members. Finally, the seal assembly includes a vibration damper disposed adjacent to or provided on the plurality of compliant plate members. The vibration damper is configured to dampen vibration of the plurality of compliant plate members.

In a second embodiment, a method of sealing a gas path between a stationary housing of a turbomachine and a rotating element turning about an axis of the turbomachine includes disposing a plurality of compliant plate members on an inner surface of the stationary housing. Each of the compliant plate members comprises at least one slot therein. The method further includes disposing at least one arcuate static ring on the inner surface of the stationary housing extending radially into the at least one slot in the compliant plate members. Finally, the method includes disposing a vibration damper adjacent to or provided on the plurality of compliant plate members.

In a third embodiment, a turbine or compressor includes a rotor rotating about an axis, a stationary housing surrounding the rotor, and a circumferentially-segmented seal assembly disposed intermediate to the rotor and the stationary housing. Each segment of the seal assembly further includes a plurality of compliant plate members attached to an interior surface of the stationary housing. The compliant plate members define a sealing ring between the stationary housing and the rotor. Each of the compliant plate members comprises at least one slot therein. Each segment of the seal assembly further includes at least one arcuate static ring attached to the interior surface of the stationary housing and extending radially into the at least one slot in the compliant plate members. Each of the at least one static ring extends circumferentially through and between a plurality of the compliant plate members, such that the at least one static ring serves as a barrier to at least some axial leakage flow between the compliant plate members. Finally, each segment of the seal assembly includes a vibration damper disposed adjacent to or provided on the plurality of compliant plate members. The vibration damper is configured to dampen vibration of the plurality of compliant plate members.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE INVENTION

Figure 1:
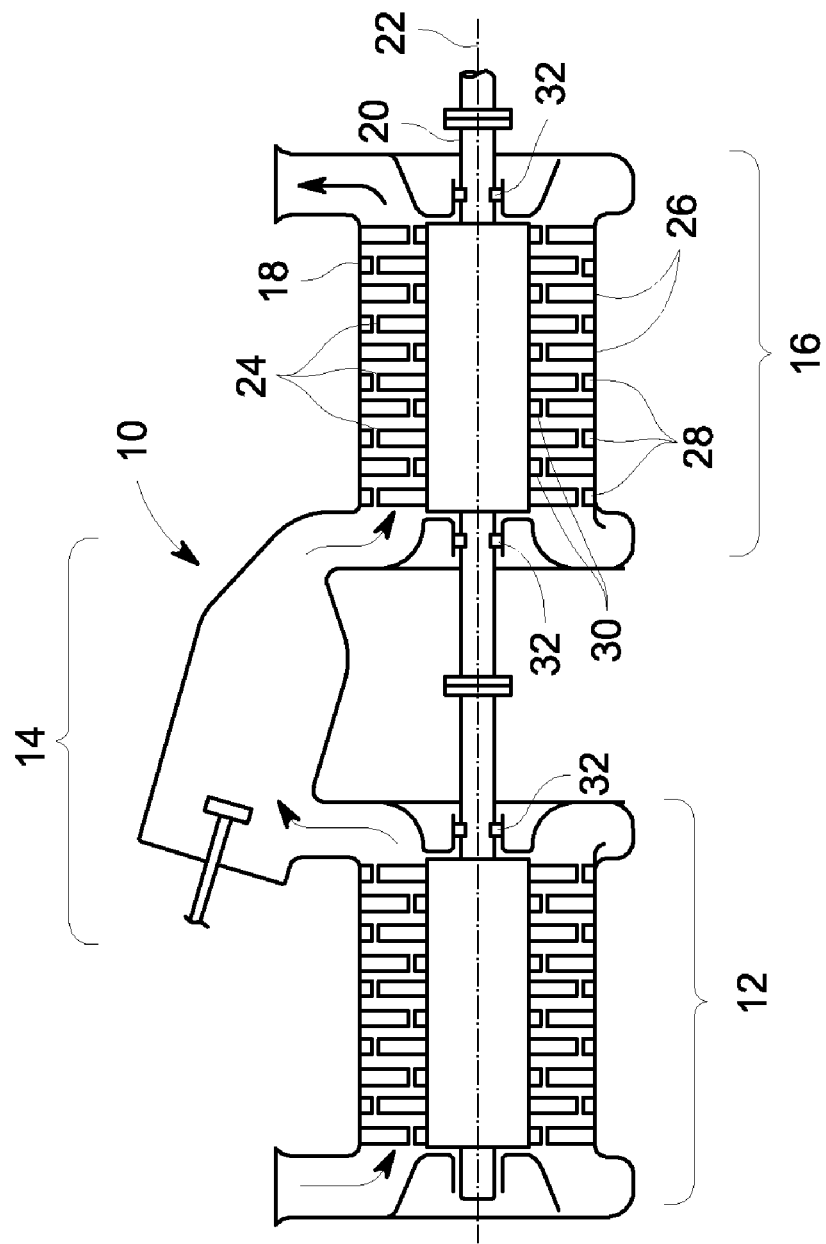
FIG. 1 is a cross-sectional view of a turbine system in accordance with an embodiment of the present disclosure.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein to simplify explanation, the disclosure is intended to cover all combinations of these embodiments.

FIG. 1 is a cross-sectional view of an embodiment of a turbine system 10, which may include a variety of components, some of which are not shown for the sake of simplicity. In the illustrated embodiment, the gas turbine system 10 includes a compressor section 12, a combustor section 14, and a turbine section 16. The turbine section 16 includes a stationary housing 18 and a rotating element 20, which rotates about an axis 22. Moving blades 24 are attached to the rotating element 20 and stationary blades 26 are attached to the stationary housing 18. The moving blades 24 and stationary blades 26 are arranged alternately in the axial direction. ThereABC are several possible locations where compliant plate seal assemblies with vibration dampers according to various embodiments may be installed, such as location 28 between a shrouded moving blade 24 and stationary housing 18, location 30 between the rotating element 20 and stationary blade 26, or an end-packing sealing location 32 between rotating element 20 and stationary housing 18.

Figure 2:
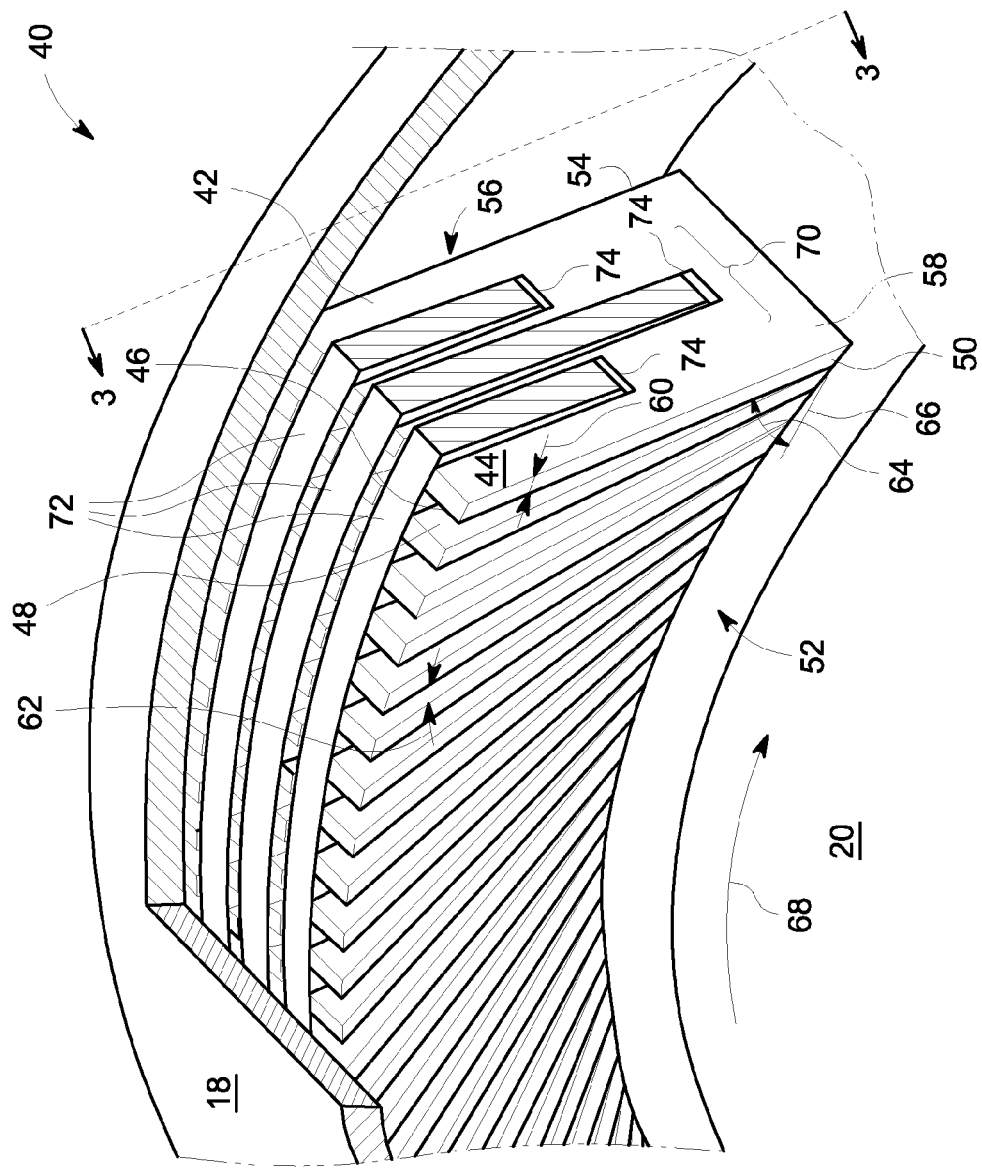
FIG. 2 is a perspective view of a seal assembly in accordance with an embodiment of the present disclosure.

The improved compliant plate seal assembly described herein provides a structure that dampens vibration of compliant plate members, thereby, potentially increasing the lifetime of the compliant plate seal assembly. The compliant plate seal assembly described herein may be used with any suitable rotary machine, such as, but not limited to, the turbine system 10 of FIG. 1. FIG. 2 is a perspective view of an exemplary compliant plate seal assembly 40. FIGS. 3-9 and FIGS. 10-15 are axial cross-sectional views of various embodiments of the seal assembly 40 taken along line 3-3. In the illustrated embodiments, the compliant plate seal assembly 40 facilitates reducing axial leakage between the rotating element 20 and the stationary housing 18. More specifically, in the exemplary embodiments, the rotating element 20 rotates relative to the stationary housing 18.

Turning to FIG. 2, the seal assembly 40 is provided with a plurality of compliant plate members 42 secured at their roots 44, in a facing relation (i.e., face-to-face), to the stationary housing 18. As used herein, the term "facing relation" refers to an orientation in which a first side surface 46 of one compliant plate member 42 is adjacent to a second side surface 48 of an immediate adjacent compliant plate member 42. The compliant plate members 42 are arranged circumferentially around the rotating element 20 and may be inclined with respect to a radial direction. In addition, the compliant plate members 42 have a significantly higher ratio of axial stiffness to radial stiffness compared to bristles in a brush seal. Each side surface 46 and 48 extends from a leading surface 50 at a high-pressure side 52 to a trailing surface 54 at a low-pressure side 56 of each compliant plate member 42, and from the root 44 to a tip 58 of each compliant plate member 42. In the exemplary embodiment, each compliant plate member 42 is substantially planar, or flat, along each side surface 46 and 48. Alternatively, compliant plate members 42 may be other than substantially planar. For example, the compliant plate members 42 may be curved, bent at one or multiple locations, or of varying thickness.

In the exemplary embodiment, when compliant plate members 42 have a substantially constant thickness 60, a gap 62 is defined between adjacent compliant plate members 42, such that the gap 62 is wider near the roots 44 than near the tips 58. Accordingly, the gap 62 tapers from the roots 44 towards the tips 58 of the compliant plate members 42. As such, the roots 44 of the compliant plate members 42 may be considered to be "loosely packed," and the tips 58 may be considered to be "tightly packed." The term "tightly packed," as used herein, refers to a configuration in which adjacent plate tips 58 are not in contact with each other but are closely spaced, for example, but not limited to, being spaced by approximately 0.005 mm. The gap 62 enables adjacent compliant plate members 42 to move freely in the radial direction. In an alternative embodiment, the thickness 60 of compliant plate members 42 may vary from the roots 44 to the tips 58, and the gaps 62 will vary accordingly.

In the exemplary embodiment, compliant plate members 42 are coupled to the stationary housing 18 such that each compliant plate member 42 is oriented at an angle 64 (also referred to herein as a "cant angle") relative to a respective tangent plane 66 of the rotating element 20. More specifically, at least one of the side surfaces 46 and/or 48 is oriented at the angle 64 relative to the tangent plane 66. In the exemplary embodiment, the cant angle 64 is less than approximately 90 degrees. In one embodiment, the cant angle 64 may be between approximately 30 degrees to 60 degrees. In the exemplary embodiment, the cant angle 64 is selected so that compliant plate members 42 are angled away from a direction 68 of rotation of the rotating element 20, such that the cant angle 64 facilitates rotation of the rotating element 20 within the seal assembly 40.

In the exemplary embodiment, compliant plate members 42 each have a substantially rectangular cross-sectional profile. However, in other embodiments, compliant plate members 42 may have a non-rectangular cross-sectional shape, such as a T-shaped cross-sectional shape, a trapezoidal cross-sectional shape, and/or any other suitable shape that enables the seal assembly 40 to function as described herein. Alternatively, each compliant plate member 42 may have a cross-section that converges or tapers from the root 44 to the tip 58, an arcuate cross-section, and/or any other cross-sectional shape that enables the seal assembly 40 to function as described herein.

An axial flow resistance member 70 extends at least partially through compliant plate members 42 and facilitates preventing axial leakage flow between gaps 62. More specifically, in the exemplary embodiment, resistance member 70 extends circumferentially about the stationary housing 18, and extends radially inward from the stationary housing 18 towards the rotating element 20. In the exemplary embodiment, resistance member 70 includes at least one annular ring 72 that is coupled to the stationary housing 18 and extends radially into a circumferential slot 74 defined within each compliant plate member 42. The annular ring 72 may be a continuous 360-degree ring concentric with the rotating element 20. In other embodiments, the annular ring 72 can be divided into several segments, such as 6 segments of 60 degrees each or 4 segments of 90 degrees each. In alternative embodiments, resistance member 70 may include any number of annular rings 72 that enables the seal assembly 40 to function as described herein.

Embodiments of the compliant plate seal assemblies 40 described herein may display self-correcting behavior when in operation caused at least in part by the configuration of the leakage path around the resistance member 70. For such embodiments of the compliant plate seal assembly 40, when a clearance between the tips 58 of the compliant plate members 42 increases, hydrostatic blow-down forces increase, thereby decreasing the tip clearance. When the clearance between the tips 58 of the compliant plate members 42 decreases, hydrostatic lift-off forces increase, thereby increasing the tip clearance. This leads to self-correcting hydrostatic lift-off/blow-down forces with passive feedback from the tip clearance. This passive feedback causes the compliant plate members 42 to maintain a small tip clearance between the compliant plate members 42 and the rotor 20, and the effective hydrostatic lift-off/blow-down forces acting on the compliant plate members 42 are balanced at that tip clearance. Therefore, the tip clearance is maintained. Thus, certain embodiments of vibration dampers described in detail below do not interfere substantially with the leakage path around the resistance member 70 in order to preserve the self-correcting behavior of the compliant plate seal assembly 40.

Figure 3:
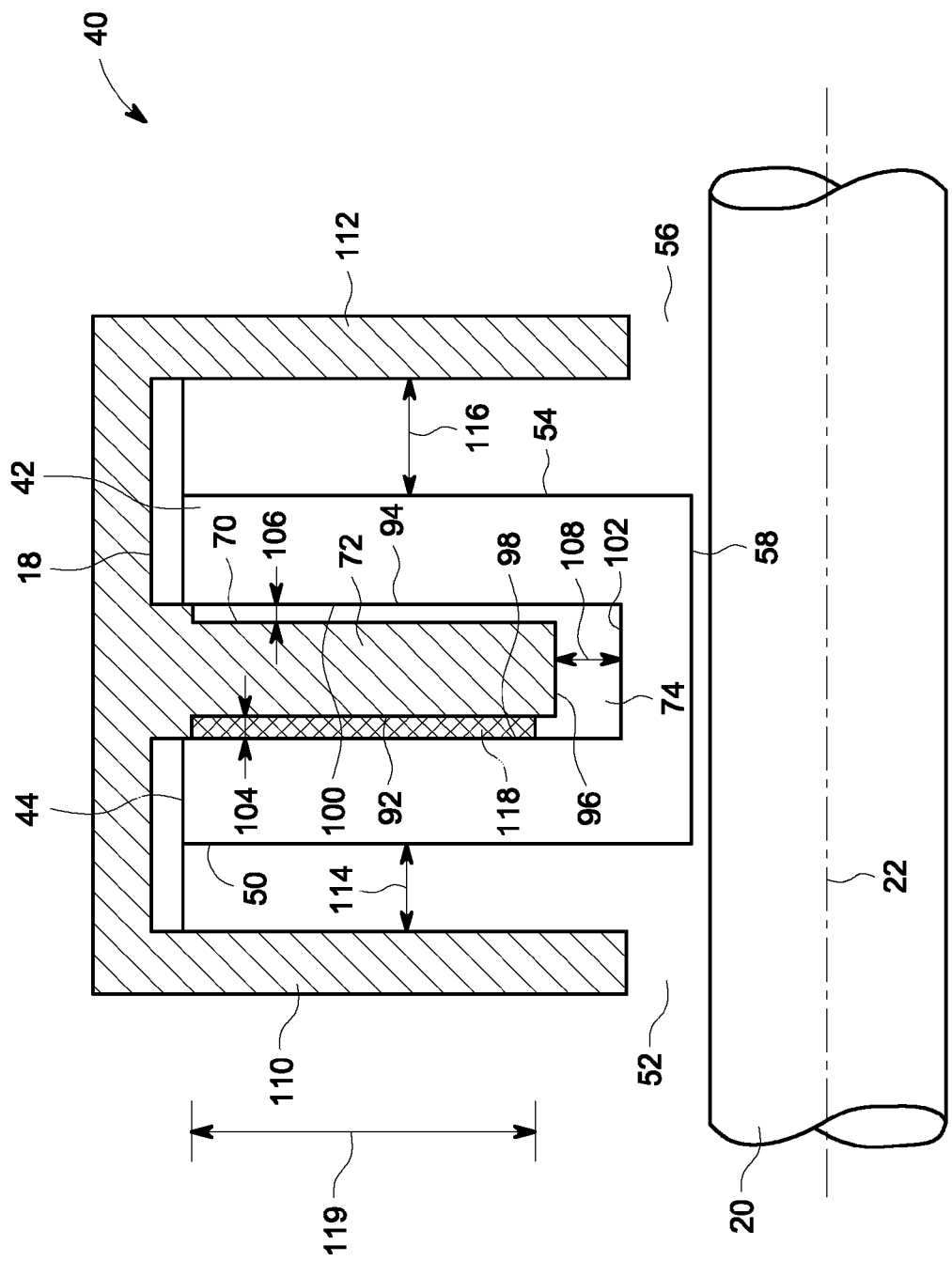
FIG. 3 is an axial cross-sectional view of a seal assembly in accordance with an embodiment of the present disclosure.

FIG. 3 illustrates an axial cross-sectional view of the compliant plate seal assembly 40 in accordance with one embodiment of the present disclosure. Unlike the seal assembly 40 shown in FIG. 2, only one annular ring 72 is shown in FIG. 3 for sake of simplicity. In alternative embodiments, the seal assembly 40 can include a plurality of the slots 74 and a plurality of the annular rings 72 with varying dimensions, such that each annular ring 72 extends into a respective slot 74. In addition, the self-correcting behavior described above is applicable to the seal assembly 40 with multiple annular rings 72 and slots 74. Elements in FIG. 3 in common with those shown in FIG. 2 are labeled with the same reference numerals.

The annular ring 72 includes a leading surface 92 facing the high-pressure side 52, a trailing surface 94 facing the low-pressure side 56, and a tip 96. The slot 74 includes a first surface 98 that faces the leading surface 92 of the annular ring 72, a second surface 100 that faces the trailing surface 94 of the annular ring 72, and a third surface 102 that faces the tip 96 of the annular ring 72. An annular ring front gap 104 is defined between the first surface 98 of the slot 74 and the leading surface 92 of the annular ring 72. An annular ring back gap 106 is defined between the second surface 100 of the slot 74 and the trailing surface 94 of the annular ring 72. A bridge gap 108 is defined between the third surface 102 of the slot 74 and the tip 96 of the annular ring 72.

The seal assembly 40 may further include a front ring 110 and a back ring 112, both coupled to the stationary housing 18. The front ring 110 extends circumferentially across the leading surfaces 50 of the compliant plate members 42 and the back ring 112 extends circumferentially across the trailing surfaces 54 of the compliant plate members 42. A gap defined between the front ring 110 and leading surfaces 50 is referred to as the front ring gap 114, and a gap defined between the back ring 112 and trailing surfaces 54 is referred to as the back ring gap 116. The front ring gap 114 and the back ring gap 116 may be made small or large. The behavior of the seal assembly 40 does not depend critically on the front ring gap 114 and the back ring gap 116.

In the illustrated embodiment, a vibration damper 118 is attached to the leading surface 92 of the annular ring 72. Various methods, such as, but not limited to, adhesives, welding, brazing, or screw fasteners, may be used to attach the vibration damper 118 to the annular ring 72. The operating temperature of the seal assembly 40 may restrict the choice of the material for the vibration damper 118 and/or the attachment method. For example, brazing or adhesives may not be appropriate at very high operating temperatures. During operation, the compliant plate members 42 may vibrate or flutter because of axial leakage that flows through the gaps 62 between adjacent compliant plate members 42. Contact between the compliant plate members 42 and the vibration damper 118 may help to reduce the amount of vibration or flutter. Thus, a thickness of the vibration damper 118 may be approximately the same as the width of the annular ring front gap 104. Alternatively, the thickness of the vibration damper 118 may be less than the annular ring front gap 104 and the differential pressure and/or the movement of fluid from the high-pressure side 52 to the low-pressure side 56 may help to deflect the first surface 98 of the compliant plate members 42 toward the surface of the vibration damper 118.

In the illustrated embodiment, the vibration damper 118 may be a porous material to enable fluid to flow through the vibration damper 118, thereby not interfering with the self-correcting behavior of the compliant plate seal assembly 40. For example, the vibration damper 118 may be a porous mesh with a porosity greater than approximately 25 percent, 50 percent, or 75 percent. The vibration damper 118 may be made from a variety of porous materials, such as, but not limited to, metals. Contact between the vibration damper 118 and the compliant plate members 42 during operation may cause wear of the vibration damper 118 and/or the compliant plate members 42. In certain embodiments, the vibration damper 118 may be an abradable mesh. In other words, the material of the vibration damper 118 may be less wear resistant than the material of the compliant plate members 42. For example, to help prevent wear of the compliant plate members 42, a strength, modulus, and/or hardness of the vibration damper 118 may be less than a respective strength, modulus, or hardness of the compliant plate members 42. As with the annular ring 72, the vibration damper 118 may be a continuous 360-degree ring concentric with the rotating element 20. In other embodiments, the vibration damper 118 may be divided into several segments such as 6 segments of 60 degrees each or 4 segments of 90 degrees each. Although shown in the illustrated embodiment occupying most of the front gap 104, in other embodiments, the vibration damper 118 may occupy a smaller portion of the front gap 104. In other words, a radial height 119 of the vibration damper 118 may be selected to provide a desired amount of vibration dampening for a particular application.

Figure 4:
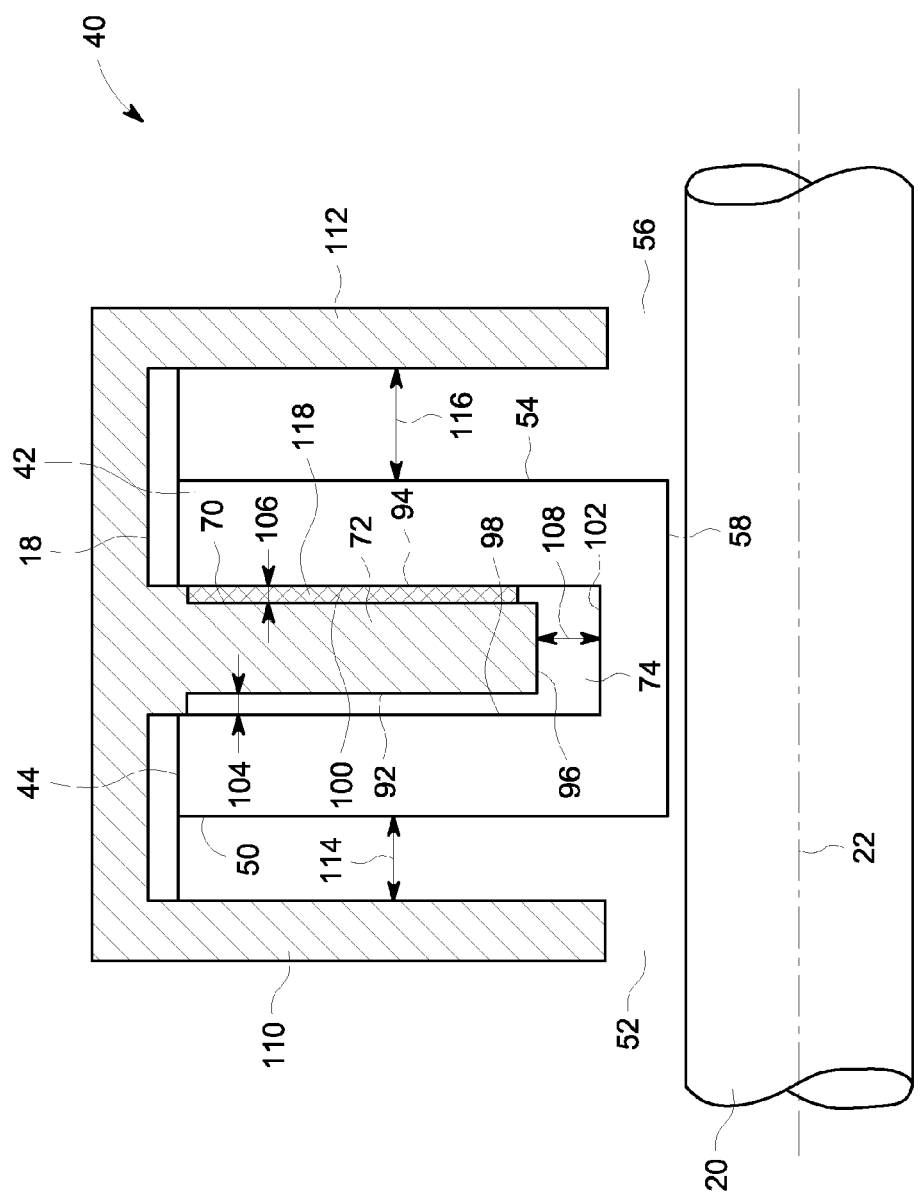
FIG. 4 is an axial cross-sectional view of a seal assembly in accordance with an embodiment of the present disclosure.

FIG. 4 illustrates an axial cross-sectional view of the compliant seal assembly 40 in accordance with another embodiment of the present disclosure. Elements in FIG. 4 in common with those shown in FIG. 3 are labeled with the same reference numerals. In the illustrated embodiment, the vibration damper 118 is attached to the trailing surface 94 of the annular ring 72. Thus, the vibration damper 118 occupies the annular ring back gap 106. In other respects, the vibration damper 118 shown in FIG. 4 is similar to the vibration damper 118 shown in FIG. 3. However, because the flow of fluid from the high-pressure side 52 to the low-pressure side 56 may cause the compliant plate members 42 to move away from the vibration damper 118, the vibration damper 18 may be disposed closer to the roots 44 of the compliant plate members 42 instead of the tips 58. In other words, the compliant plate members 42 may deflect away from the vibration damper 118 less near the roots 44 than the tips 58 because the compliant plate members 42 are attached to the stationary housing 18 near the roots 44.

Figure 5:
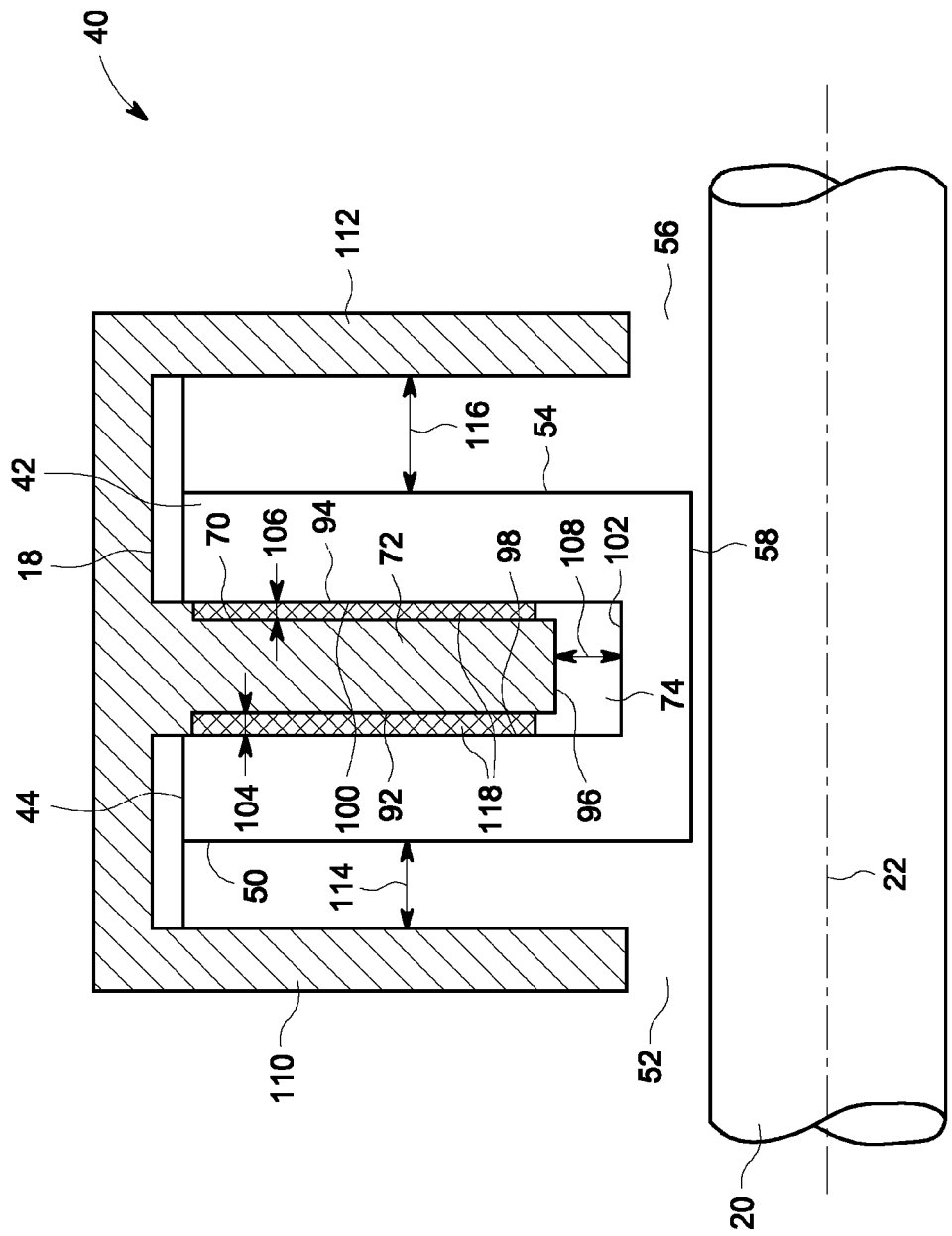
FIG. 5 is an axial cross-sectional view of a seal assembly in accordance with an embodiment of the present disclosure.

FIG. 5 illustrates an axial cross-sectional view of the compliant seal assembly 40 combining elements of previously described embodiments. Elements in FIG. 5 in common with those shown in FIG. 3 are labeled with the same reference numerals. In the illustrated embodiment, two vibration dampers 118 are provided in the compliant seal assembly 40. A first vibration damper 118 is attached to the first surface 98 and a second vibration damper 118 is attached to the trailing surface 94. Such a configuration of two vibration dampers 118 may provide additional damping of the compliant plate members 42. In addition, as one of the vibration dampers 118 wears, the second vibration damper 118 may continue to provide vibration damping. Other aspects of the vibration dampers 118 are similar to those described in detail above.

Figure 6:
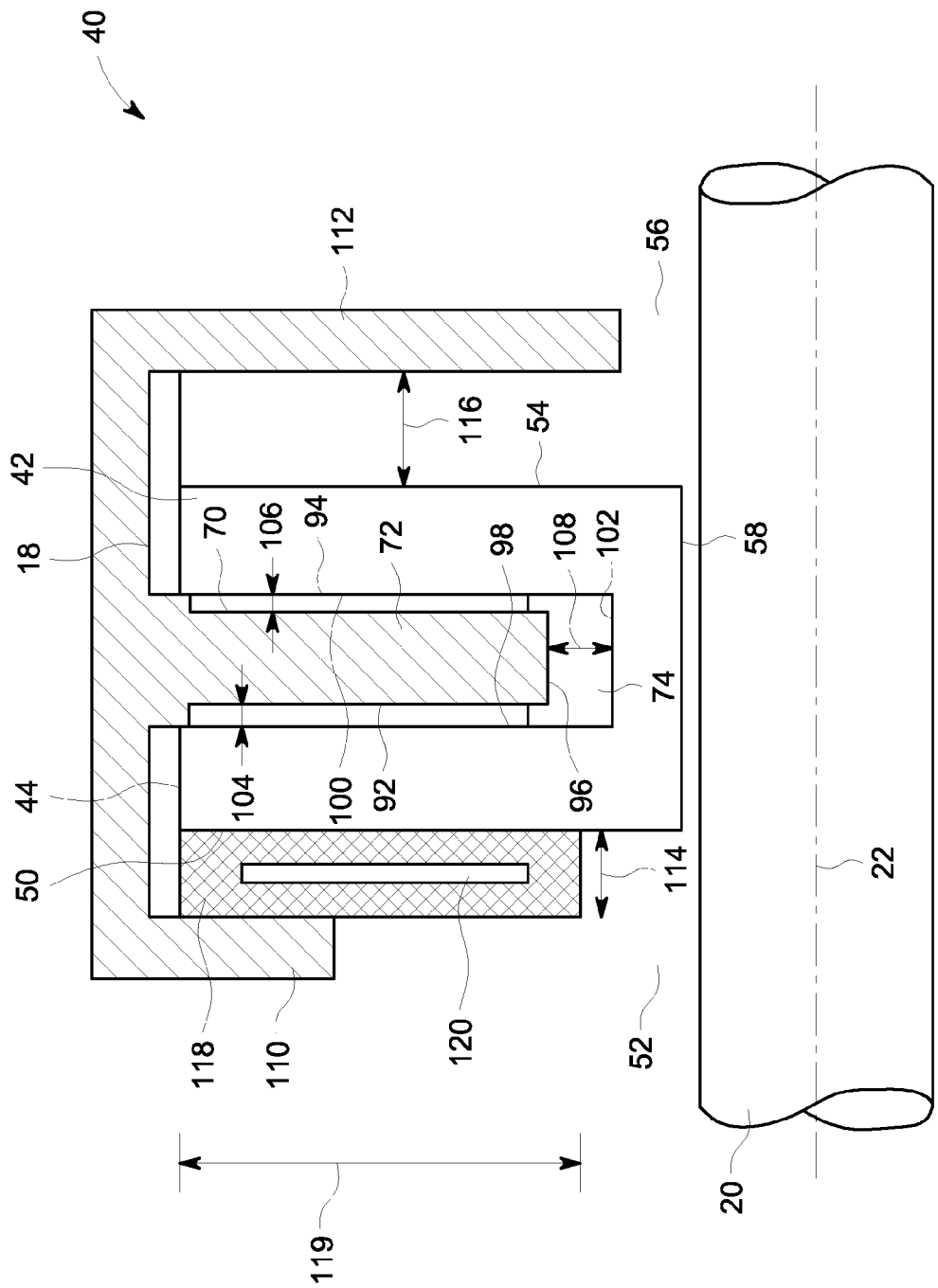
FIG. 6 is an axial cross-sectional view of a seal assembly in accordance with an embodiment of the present disclosure.

FIG. 6 illustrates an axial cross-sectional view of the compliant seal assembly 40 in accordance with a further embodiment of the present disclosure. Elements in FIG. 6 in common with those shown in FIG. 3 are labeled with the same reference numerals. In the illustrated embodiment, the vibration damper 118 is attached to a surface of the front ring 118 facing the compliant plate members 42. As shown, the vibration damper 118 may occupy the front ring gap 114. As with previously described embodiments of the vibration damper 118, the configuration, such as the radial height 119, may be adjusted to suit the needs of a particular application. The vibration damper 118 may include a backing plate 120, which is not porous and enables one or both of the fluid pressure or fluid flow rate to act as a biasing mechanism to maintain contact between the vibration damper 118 and the leading surface 50 of the compliant plate members 42. In addition, the backing plate 120 may enable the vibration damper 118 to be radially aligned within the compliant seal assembly 40 and may provide additional thickness and/or stability for the vibration damper 118. The backing plate 120 may be made from various materials such as, but not limited to, metals. In addition, the backing plate 120 may be configured in a continuous 360-degree ring or in smaller segments. In various embodiments, the radial height of the front ring 110 may be shorter or longer than represented in FIG. 6. Other embodiments may not include the front ring 110. Other aspects of the vibration damper 118 shown in FIG. 6 are similar to the vibration dampers 118 described in detail above.

Figure 7:
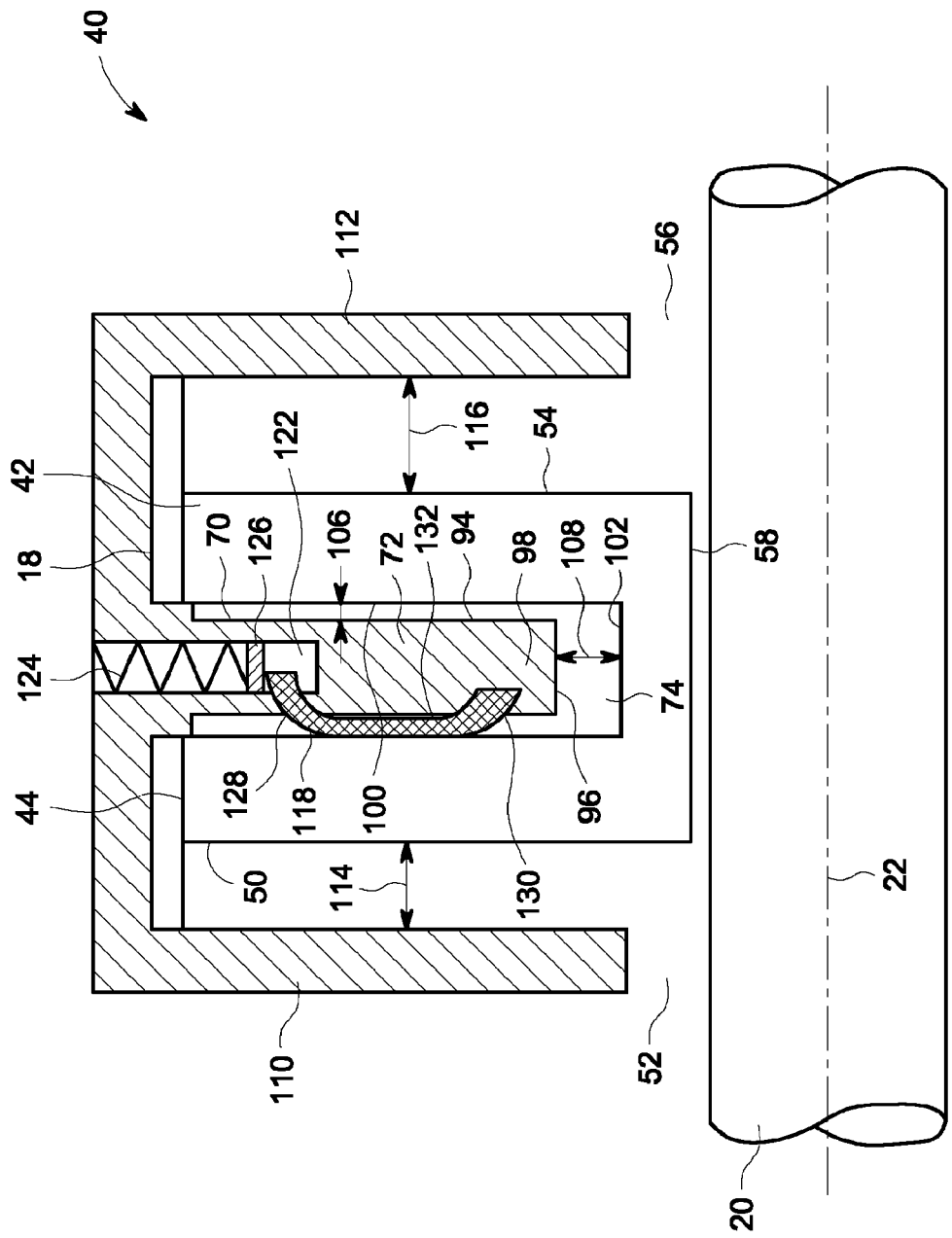
FIG. 7 is an axial cross-sectional view of a seal assembly in accordance with an embodiment of the present disclosure.

FIG. 7 illustrates an axial cross-sectional view of the compliant seal assembly 40 in accordance with another embodiment of the present disclosure. Elements in FIG. 7 in common with those shown in FIG. 3 are labeled with the same reference numerals. In the illustrated embodiment, the annular ring 72 includes a biasing element slot 122, which extends circumferentially and radially into the annular ring 72. A biasing element 124 is disposed in the biasing element slot 122. The top of the biasing element 124 may be attached to the stationary housing 18 or the top of the biasing element slot 122. The biasing element 124 may be a spring or other spring-like device. Attached to the bottom of the biasing element 124 is a plunger 126, which may be used to transfer a biasing force from the biasing element 124 to the vibration damper 118. The plunger 126 may be an arcuate ring that extends circumferentially through the biasing element slot 122. The top of the vibration damper 118 may extend into the biasing element slot 122 through a top opening 128. Similarly, the bottom of the vibration damper 118 may extend into a bottom opening 130 located near the tip 96 of the annular ring 72. The vibration damper 118 may be fixed in the bottom opening 130 and able to freely move back and forth through the top opening 128. For example, movement of the biasing element 124 downward toward the axis 22 may cause the vibration damper 118 to move outward though the top opening 128. During operation, the vibration damper 118 may wear and become thinner. In order for the vibration damper 118 to continue to contact the compliant plate members 42, the biasing element 124 may push downward on the vibration damper 118, causing more of the vibration damper 118 to push out through the top opening 128. Although shown in the front gap 104, the vibration damper 118 may also be located in the back gap 106, or in both the front and back gaps 104 and 106. Other aspects of the vibration damper 118 are similar to those described in detail above.

Figure 8:
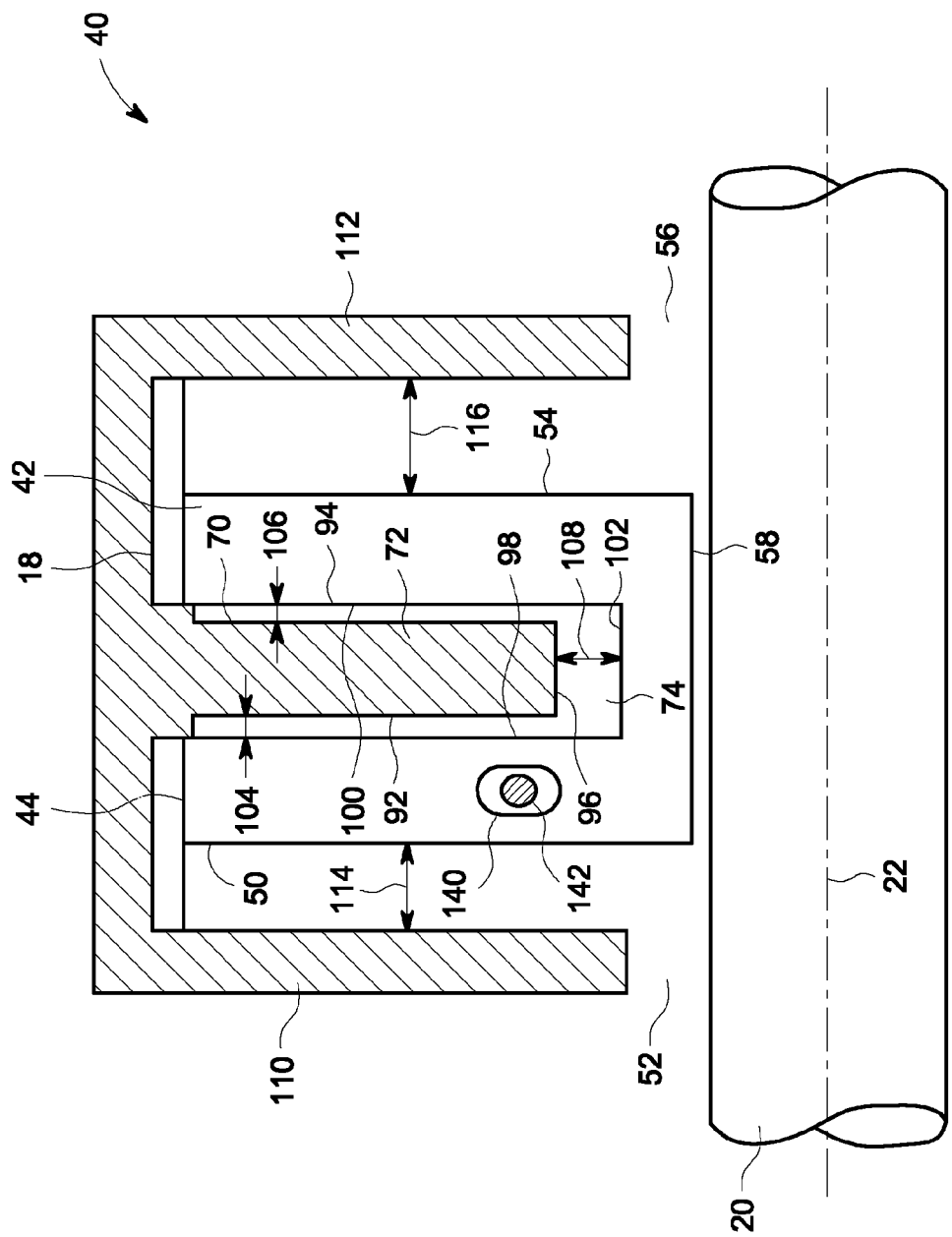
FIG. 8 is an axial cross-sectional view of a seal assembly in accordance with an embodiment of the present disclosure.

FIG. 8 illustrates an axial cross-sectional view of another embodiment of the compliant seal assembly 40. Elements in FIG. 8 in common with those shown in FIG. 3 are labeled with the same reference numerals. A vibration damper slot 140 extends circumferentially through the high-pressure sides of the compliant plate members 42. A vibration member ring 142 extends circumferentially through the vibration damper slot 140 of the compliant plate members 42. During operation, the vibration damper 142 contacts the interior surfaces of the vibration damper slot 140, which may dampen vibration of the compliant plate members 42. The vibration damper ring 142 may be a continuous 360-degree ring concentric with the rotating element 20 or be divided into smaller segments. The vibration damper ring 142 may have a circular cross-section as illustrated in FIG. 8 or may have other cross-sectional shapes such as, but not limited to, ovals, squares, rectangles, triangles, and so forth. Similarly, although shown with an oval cross-section in FIG. 8, the vibration damper slot 140 may have other cross-sectional shapes such, but not limited to, squares, rectangles, triangles, and so forth.

In the illustrated embodiment, the vibration damper slot 140 does not extend all the way through the high-pressure side of the compliant plate members 42, in order to not divide the compliant plate members 42 into two pieces. In other words, the vibration damper slot 140 is a closed slot. A radial height of the vibration damper slot 140 may be greater that a radial height of the vibration damper ring 142 to enable the vibration damper ring 142 to move radially in response to radial movement of the compliant plate members 42. Similarly, an axial width of the vibration damper slot 140 may be greater that an axial width of the vibration damper ring 142 to enable the vibration damper ring 142 to move axially in response to axial movement of the compliant plate members 42. Because no fluid flows through the vibration damper slot 140, the vibration damper ring 142 need not be a porous material. However, to help prevent excessive wear of the interior surface of the vibration damper slot 140, a hardness of the vibration damper ring 142 may be less than the hardness of the compliant plate members 42. Although shown on the high-pressure side of the compliant plate members 42, the vibration damper slot 140 may also be located on the low-pressure side, or on both the high-pressure and low-pressure sides of the compliant plate members 42. Other aspects of the vibration damper ring 142 are similar to those of previously described vibration dampers 118.

Figure 9:
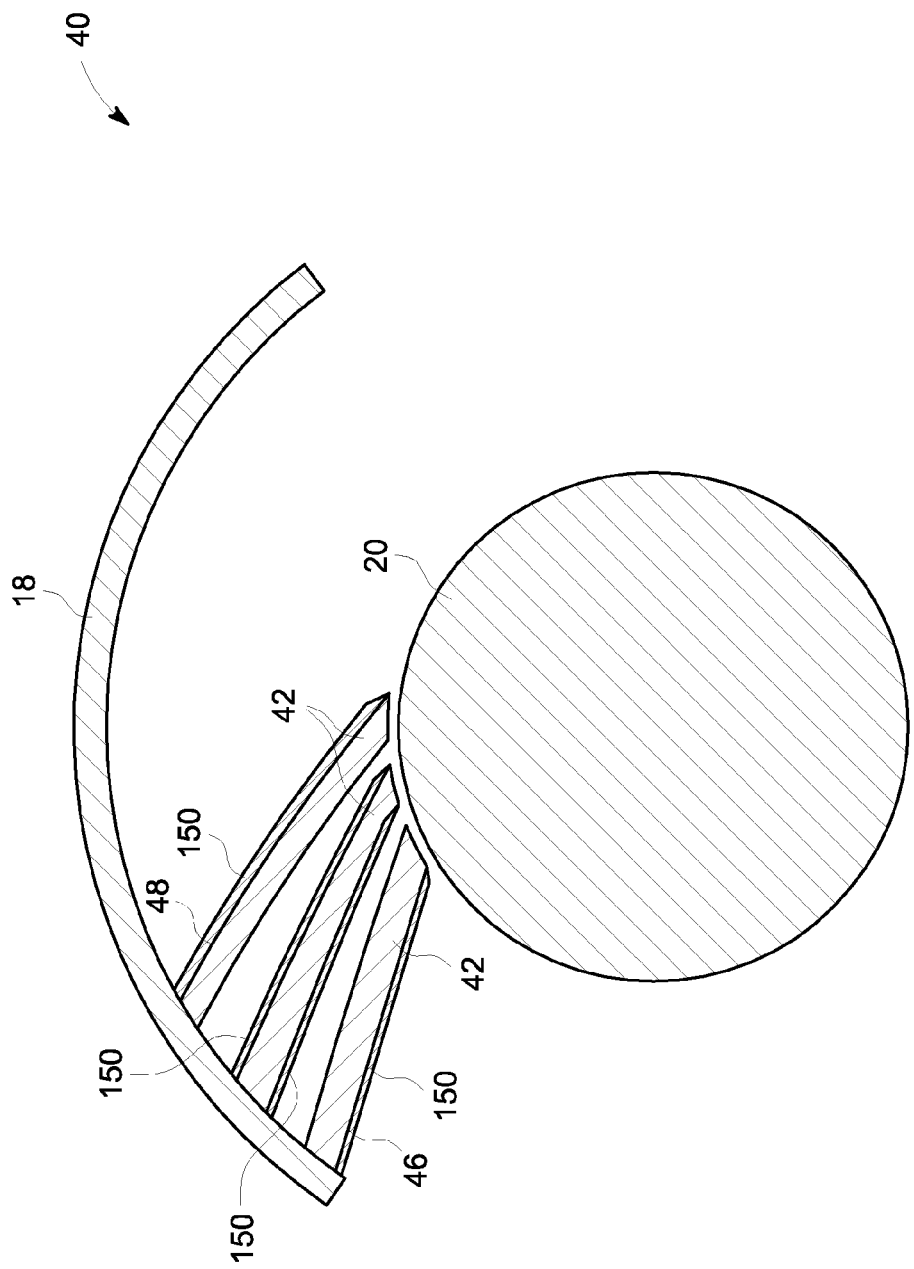
FIG. 9 is a radial cross-sectional view of a seal assembly in accordance with an embodiment of the present disclosure.

FIG. 9 illustrates a radial cross-section of the compliant seal assembly 40 in accordance with a further embodiment. Elements in FIG. 9 in common with those shown in FIG. 3 are labeled with the same reference numerals. In the illustrated embodiment, a coating 150 is provided on one or more surfaces of the compliant plate members 42. For example, the coating may be provided on the first side surface 46 of the compliant plate members 42, the second side surface 48, or on both the first and second side surfaces 46 and 48. The coating 150 may dampen vibration of the compliant plate members 42. Specifically, the coating 150 may act as a structural damper to dissipate vibrational energy in the compliant plate members 42. Typically, structural damping suppresses only resonant motions. However, structural damping may also attenuate non-resonant vibration because of the effect of increased stiffness and/or mass of the compliant plate members 42. The coating 150 may be made from a viscoelastic material, which is capable of storing strain energy when deformed and dissipating a portion of this energy through hysteresis. Examples of materials that may be used for the coating 150 include, but are not limited to, chromium nitride (CrN), nickel titanium (NiTi), diamond-like carbon (DLC), and so forth. Methods for applying the coating 150 to the compliant plate members 42 include, but are not limited to, physical vapor deposition (PVD), chemical vapor deposition (CVD), spraying, dipping, brushing, web coating, calendaring, and so forth. Although shown covering the entire surface of the compliant plate members 42, in other embodiments, the coating 150 may cover only a portion of the surface of the compliant plate members 42 based on the amount of the vibration damping needed. Moreover, a thickness of the coating 150 may be selected to achieve a desired amount of vibration damping. Thicker coatings 150 may result in additional vibration damping. However, the thickness of the coating 150 may not be so great as to interfere with the distance of the gaps 62 between adjacent compliant plate members 42. In addition, the thickness of the coating 150 may taper toward the tip 58 of each compliant plate member 42. In certain embodiments, the coating 150 may be combined with the vibration dampers 118 described above.

Figure 10:
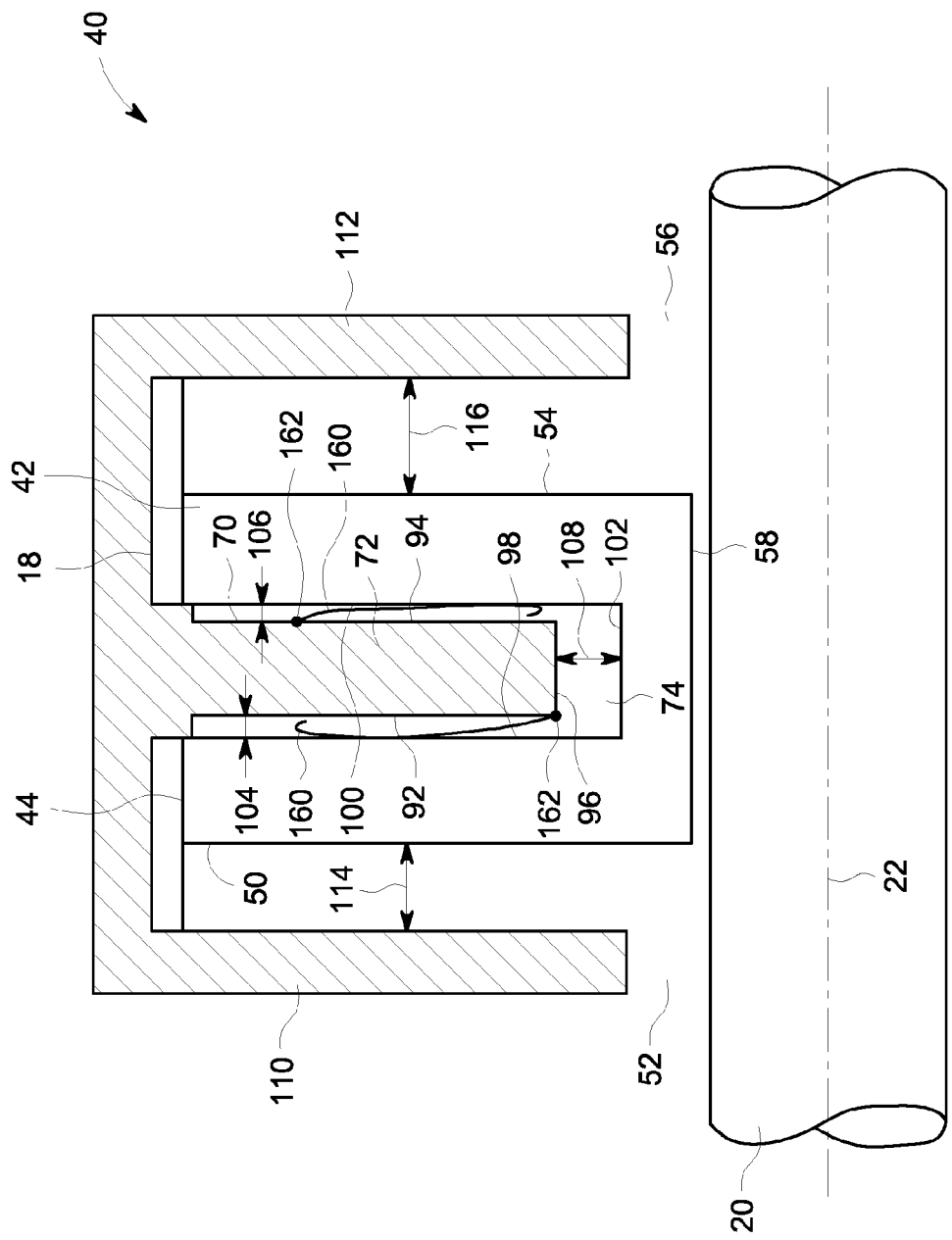
FIG. 10 is an axial cross-sectional view of a seal assembly in accordance with an embodiment of the present disclosure.

FIG. 10 illustrates an axial cross-sectional view of the compliant seal assembly 40 in accordance with another embodiment of the present disclosure. Elements in FIG. 10 in common with those shown in FIG. 3 are labeled with the same reference numerals. In the illustrated embodiment, a vibration damper plate 160 may be used to dampen vibration of the compliant plate members 42. Specifically, the vibration damper plate 160 may be attached to the annular ring 72 at a connection point 162. The connection point 162 may represent an adhesive, a weld, a braze, a screwed connection, or any other suitable method of joining two materials together. The vibration damper plate 160 may have a generally convex shape with the outer convex surface in contact with the compliant plate members 42. In the illustrated embodiment, the vibration damper plate 160 located in the front gap 104 may be attached to the annular ring 72 near the tip 96 of the annular ring 72. Such a configuration may enable fluid flowing from the high-pressure side 52 near the root 44 of the compliant plate members 42 to help push the vibration damper plate 160 against the compliant plate members 42. Similarly, the vibration damper plate 160 located in the back gap 106 may be configured with the connection point 162 closer to the root 44 of the compliant plate members 42. Thus, the flow of fluid from the tip 96 of the annular ring 72 toward the roots 44 of the compliant plate members 42 may help to push the vibration damper plate 160 against the compliant plate members 42. In certain embodiments, the vibration damper plate 160 may be provided only in the front gap 104, only in the back gap 106, or in both the front and back gaps 104 and 106.

The hardness of the vibration damper plate 160 may be less than the hardness of the compliant plate members 42. In addition, the surface of the vibration damper plate 160 may be smoother than the surface of the vibration damper 118. A smooth surface for the vibration damper plates 160, instead of the porous mesh described in detail above, may cause less wear of the compliant plate members 42. In addition, the vibration damper plate 160 may be perforated to enable some fluid to flow through the vibration damper plate 160, which may facilitate the self-correcting behavior of the seal assembly 40. In other words, a perforated vibration damper plate 160 may act in an analogous manner to the porous vibration dampers 118 described in detail above. The vibration damper plate 160 may be configured as a single 360-degree arcuate ring or may be configured as several arcuate segments. If the vibration damper plate 160 is configured as multiple segments, the segments may be separated by gaps to further promote the self-correcting behavior of the seal assembly 40. In other words, fluid may flow through the gaps between the segments of the vibration damper plates 160. In other embodiments, the multiple segments of the vibration damper plates 160 may be configured without intervening gaps or the segments may overlap with one another.

Figure 11:
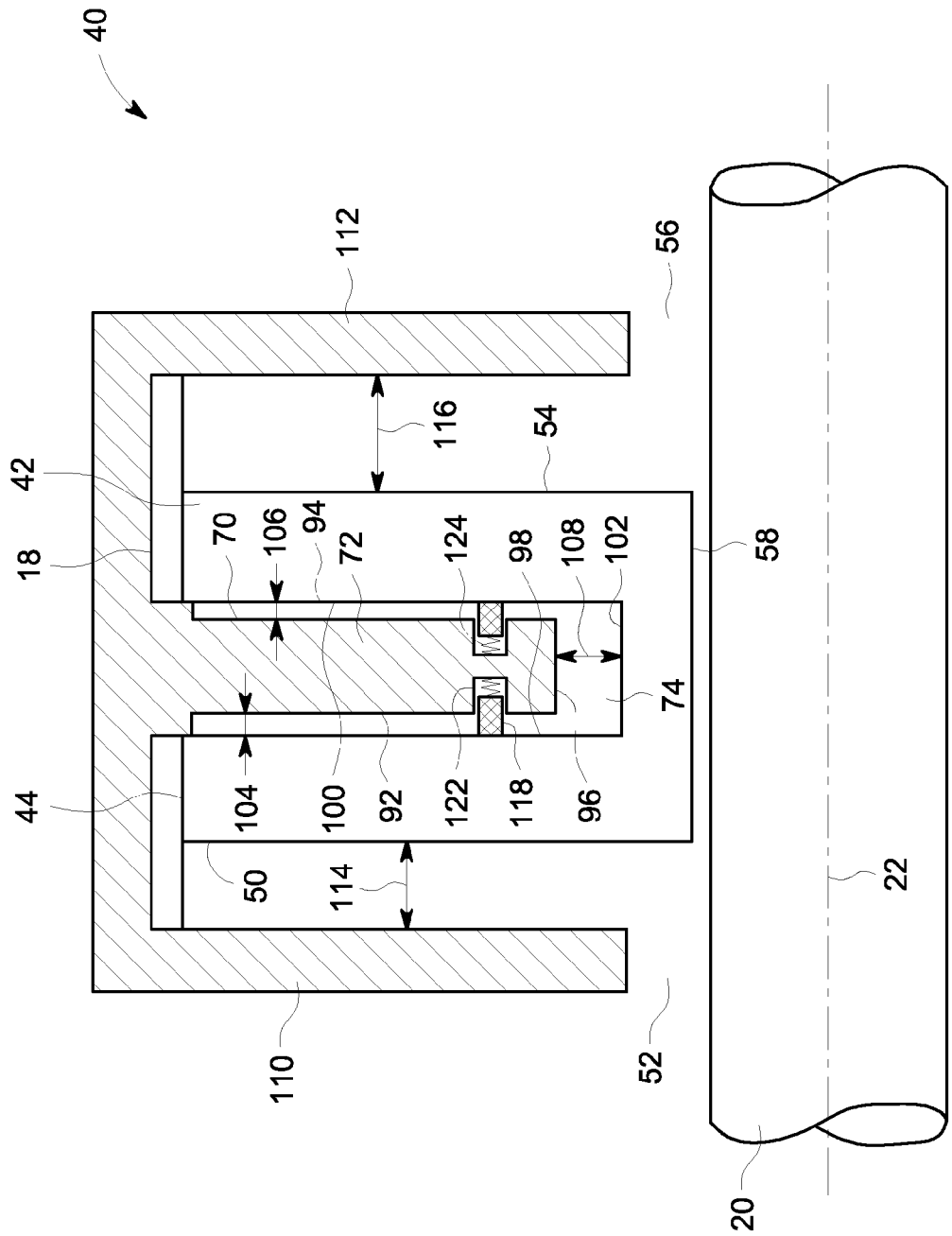
FIG. 11 is an axial cross-sectional view of a seal assembly in accordance with an embodiment of the present disclosure.

FIG. 11 illustrates an axial cross-sectional view of the compliant seal assembly 40 in accordance with an embodiment of the present disclosure. Elements in FIG. 11 in common with those shown in earlier figures are labeled with the same reference numerals. In the illustrated embodiment, the vibration dampers 118 are disposed in the biasing element slot 122, which is located near the tip 96 of the annular ring 72. In addition, the biasing elements 124 attached to the vibration dampers 118 help to push the vibration dampers 118 against the compliant plate members 42. Further, the vibration dampers 118 may be able to move back and forth to accommodate axial movement of the compliant plate members 42. In addition, as the vibration dampers 118 wear, the biasing element 124 may continue to help maintain contact between the vibration damper 118 and the compliant plate members 42. In certain embodiments, the vibration damper, biasing element slot 122 and biasing elements 124 may be disposed only in the front gap 104, only in the back gap 106, or in both the front and back gaps 104 and 106. When the vibration damper 118 is disposed in both the front and back gaps 104 and 106, a portion of the annular ring 72 may separate the biasing element slot 122. In other words, fluid may not be able pass through the biasing element slot 122 from the front gap 104 to the back gap 106. As with previous embodiments, the vibration damper 118 may be configured as a single 360-degree arcuate ring or as several arcuate segments. Other aspects of the seal assembly 40 are similar to those described in detail above.

Figure 12:
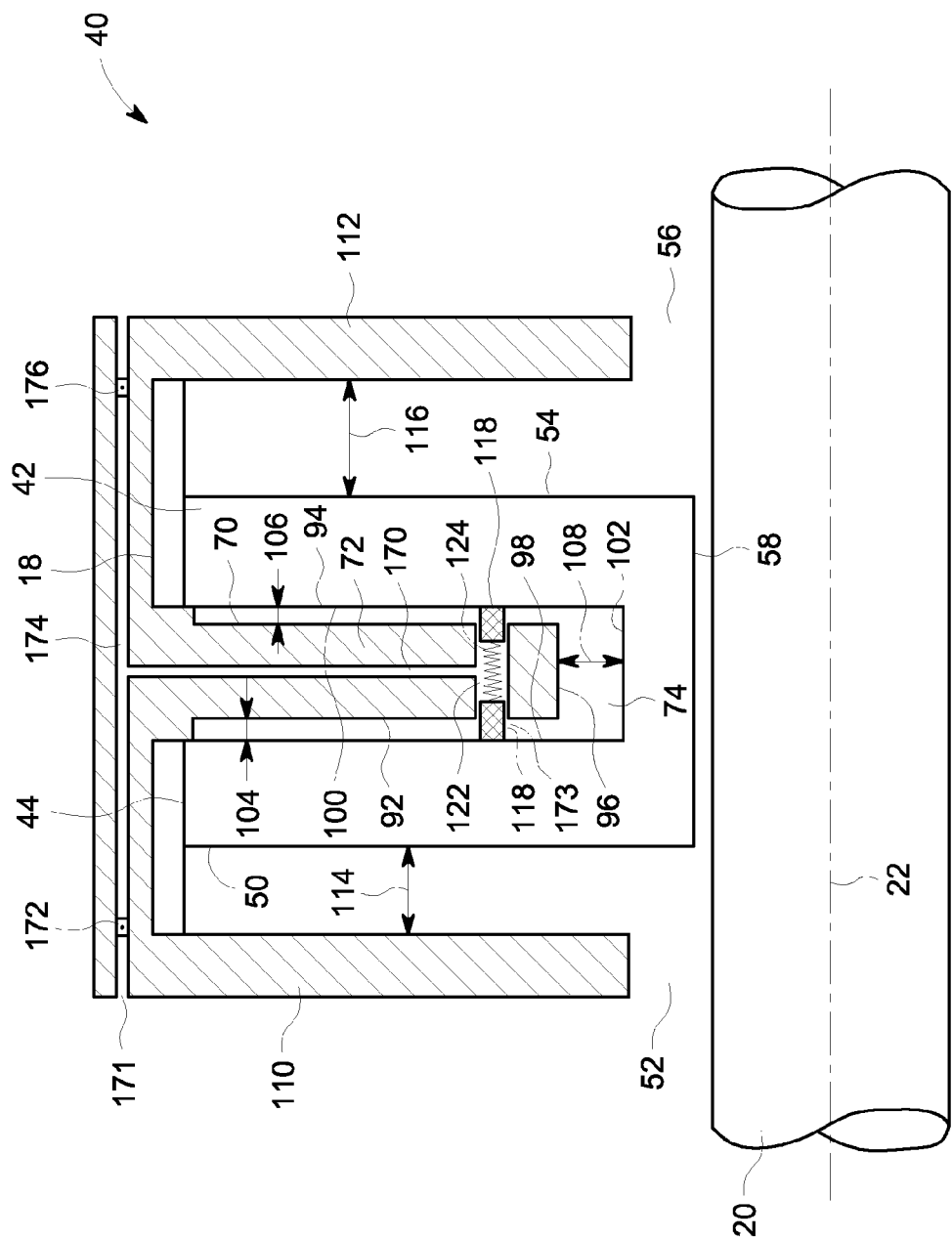
FIG. 12 is an axial cross-sectional view of a seal assembly in accordance with an embodiment of the present disclosure.

FIG. 12 illustrates an axial cross-sectional view of an embodiment of the compliant seal assembly 40. Elements in FIG. 12 in common with those shown in earlier figures are labeled with the same reference numerals. In the illustrated embodiment, the two vibration dampers 118 are only separated by the biasing element 124 and are disposed in the biasing element slot 122, which extends axially across the annular ring 72. The biasing element 124 may help both the vibration dampers 118 to maintain contact with the compliant plate members 42. In addition, a high-pressure fluid conduit 170 may be provided to help push the vibration damper 118 against the compliant plate members 42. Specifically, the high-pressure conduit 170 may be provided in the stationary housing 18 and through the annular ring 72 to enable fluid from the high-pressure side 52 at an upstream pressure 171 to flow into the biasing element slot 122 at a pressure 173 at the vibration damper 118 location. In certain embodiments, the upstream pressure 171 may be much larger than the pressure 173 at the vibration damper 118 location. Thus, a restriction orifice 172 may be provided in the high-pressure conduit 170 to restrict the flow rate of the high-pressure fluid into the biasing element slot 122, thereby helping to avoid excessive biasing of the vibration dampers 118 against the compliant plate members 42. Excessive biasing of the vibration dampers 118 may cause accelerated wear of the vibration dampers 118.

Figure 13:
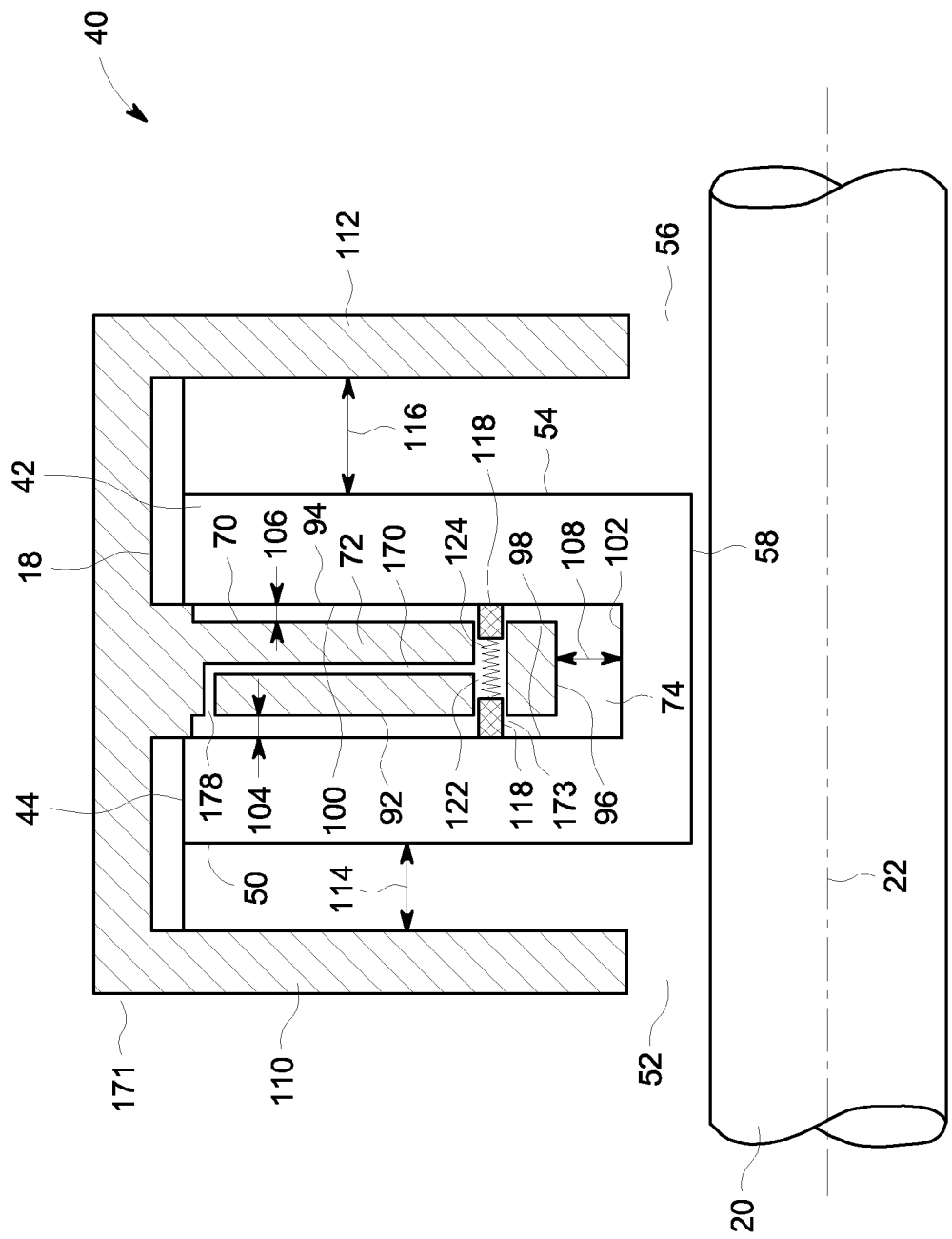
FIG. 13 is an axial cross-sectional view of a seal assembly in accordance with an embodiment of the present disclosure.

In other embodiments where there is a high differential pressure across the compliant plate seal assembly 40, the excess differential pressure may cause excessive biasing of the vibration dampers 118 against the compliant plate members 42. A bleed-off conduit 174 may be provided to the low-pressure side 56 to help avoid excessive biasing of the vibration dampers 118. In addition, the bleed-off conduit 174 may include a bleed-off restriction orifice 176 to reduce further the amount of biasing of the vibration dampers 118. In other embodiments, bleed-off of excess differential pressure may also be achieved through the gap between the vibration dampers 118 and the biasing element slot 122. In further embodiments, the upstream opening of the high-pressure conduit 170 may be disposed in the annular ring front gap 104 as shown in FIG. 13. A pressure 178 in the annular ring front gap 104 may be lower than the pressure 171 of the high-pressure side 52, thereby reducing the differential pressure across the high-pressure conduit 170 and limiting the amount of biasing of the vibration dampers 118. The pressure 178 in the annular ring front gap 104 may be greater than the pressure 173 at the vibration damper 118 location, which facilitates biasing of the vibration dampers 118 against the compliant plate members 42. Other aspects of the seal assemblies 40 shown in FIGS. 12 and 13 are similar to those described in detail above.

Figure 14:
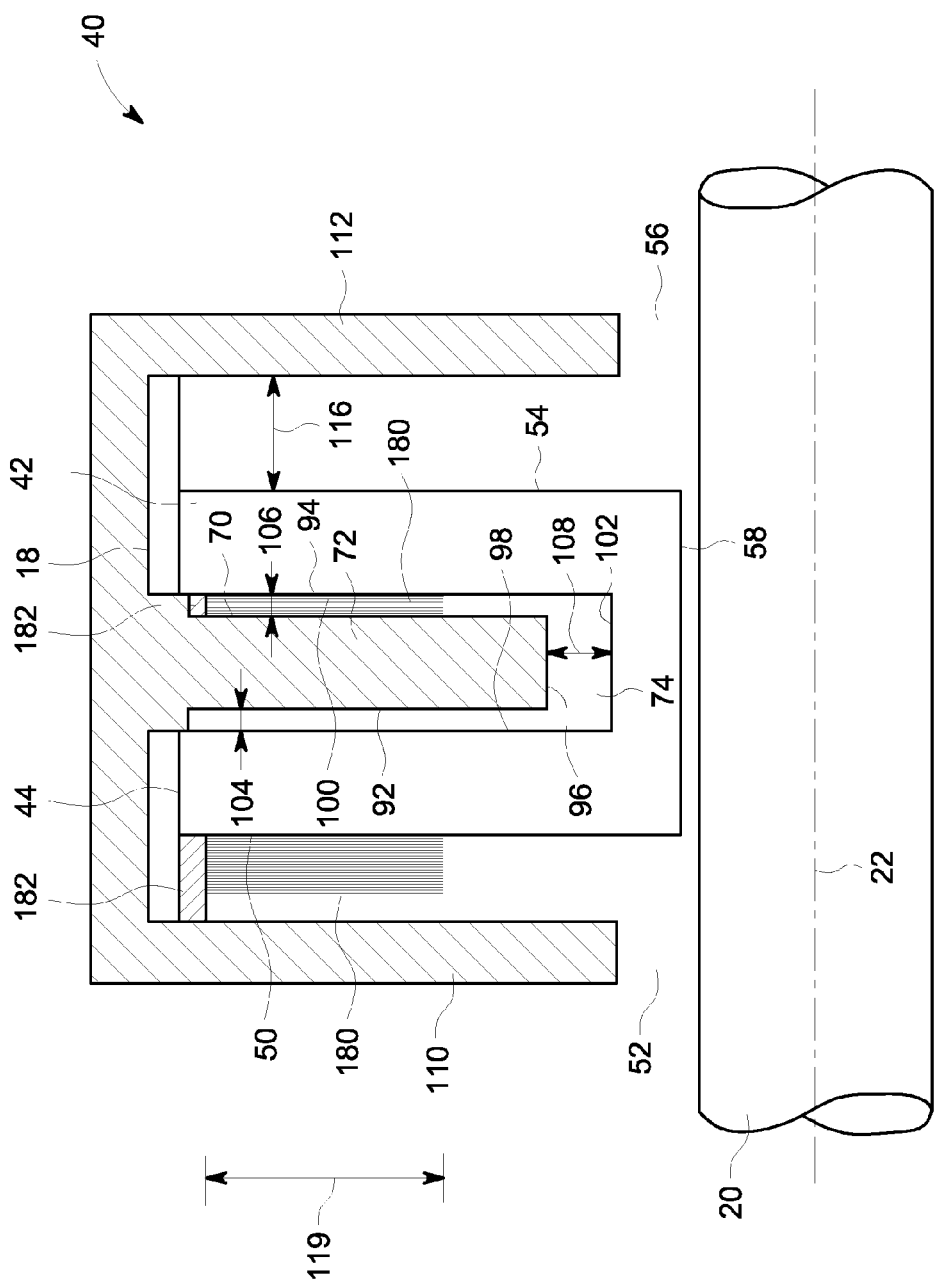
FIG. 14 is an axial cross-sectional view of a seal assembly in accordance with an embodiment of the present disclosure.

FIG. 14 illustrates an axial cross-sectional view of an embodiment of the compliant seal assembly 40. Elements in FIG. 14 in common with those shown in earlier figures are labeled with the same reference numerals. In the illustrated embodiment, vibration damper bristles 180 may be provided to dampen vibration of the compliant plate members 42. The vibration damper bristles 180 may be made from a material, such as a metal, with a hardness less than the hardness of the compliant plate members 42. A diameter of the vibration damper bristles 180 may be between approximately 0.1 mm to 0.8 mm, 0.2 mm to 0.6 mm, or 0.4 mm to 0.5 mm. The diameter, a spacing between, and/or an arrangement of the vibration damper bristles 180 may be configured to enable fluid to flow through the vibration damper bristles 180 and to enable the vibration damper bristles 180 to move freely in both the axial and/or radial directions. In addition, the vibration damper bristles 180 may be attached to the stationary housing 18 via an attachment structure 182, which may include an adhesive, a weld, a screwed connected, or any other suitable methods of joining two objects. Because the vibration damper bristles 180 may be able to move more freely than previous vibration dampers 118, the seal assembly 40 includes the front ring 110, which may be used to help reduce hysteresis of the vibration damper bristles 180. The radial length 119 of the vibration damper bristles 180 may be less than the radial height of the annular ring 72, as the vibration damper bristles 180 are provided to dampen vibration of the compliant plate members 42 and not to act as a seal. Further, the vibration damper bristles 180 may be oriented at an angle different from the cant angle 64 of the compliant plate members 42 in order to help prevent the vibration damper bristles 180 from entangling or interfering with the compliant plate members 42. In the illustrated embodiment, the vibration damper bristles 180 may be disposed in the space between the front plate 110 and the compliant plate members 42 and in the back gap 106, which are both locations where the flow of fluid helps to push the vibration damper bristles 180 toward the compliant plate members 42. In other embodiments, the vibration damper bristles 180 may be disposed only near the front plate 110, or only in the back gap 106.

Figure 15:
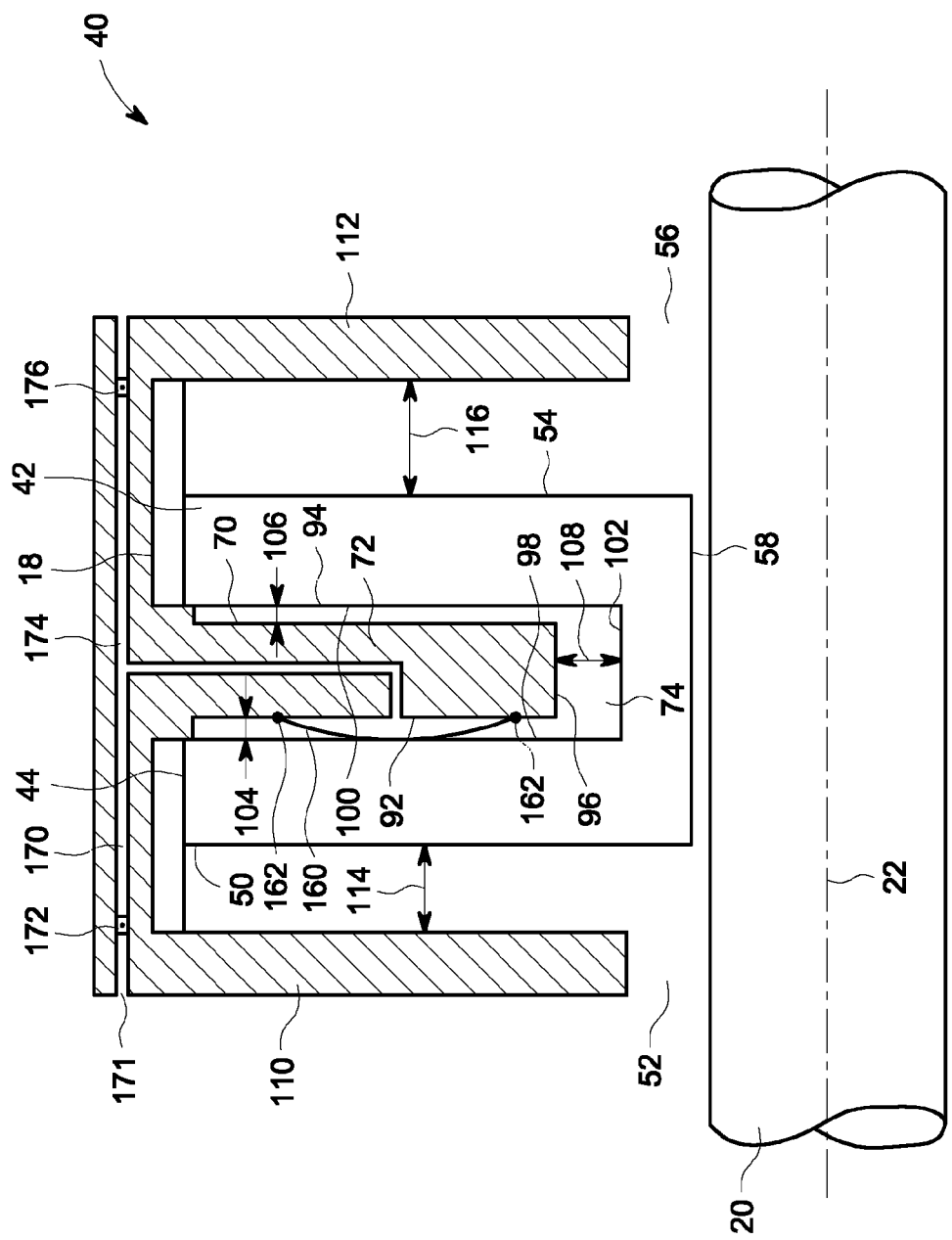
FIG. 15 is an axial cross-sectional view of a seal assembly in accordance with an embodiment of the present disclosure.

FIG. 15 illustrates an axial cross-sectional view of an embodiment of the compliant seal assembly 40. Elements in FIG. 15 in common with those shown in earlier figures are labeled with the same reference numerals. The illustrated embodiment combines features from embodiments described in detail above. Specifically, the vibration damper plate 160 is used to help dampen vibration of the compliant plate members 42. The vibration damper plate 160 is attached to the annular ring 72 at two connection points 162. In addition, the high-pressure fluid conduit 170 is provided in the stationary housing 18 and the annular ring 72. The high-pressure fluid in the fluid conduit 170 helps to push the vibration damper plate 160 against the compliant plate members 42. In certain embodiments, the upstream pressure 171 may be high enough to cause excessive biasing of the vibration damper plate 160 against the compliant plate members 42. Thus, the bleed-off conduit 174 may be provided to the low-pressure side 56 to help avoid excessive biasing of the vibration damper plate 160. In addition, the restriction orifice 172 and bleed-off restriction orifice 176 may be included in the high-pressure conduit 170 and the bleed-off conduit 174 respectively to restrict the flow rate of the high-pressure fluid against the vibration damper plate 160, thereby helping to avoid excessive biasing of the vibration damper plate 160 against the compliant plate members 42. In other embodiments, the upstream opening of the high-pressure conduit 170 may be disposed in the annular ring front gap 104 similar to the embodiment shown in FIG. 13. The vibration damper plate 160 may be made from a flexible material such as, but not limited to, metal. Because the vibration damper plate 160 occupies the front gap 104, the vibration damper plate 160 may help to reduce leakage through the compliant plate members 42. As with earlier embodiments, the vibration damper plate 160 may be provided in the front gap 104, the back gap 106, or both the front and back gaps 104 and 106. Other aspects of the seal assembly 40 are similar to those described in detail above.

Figure 16:
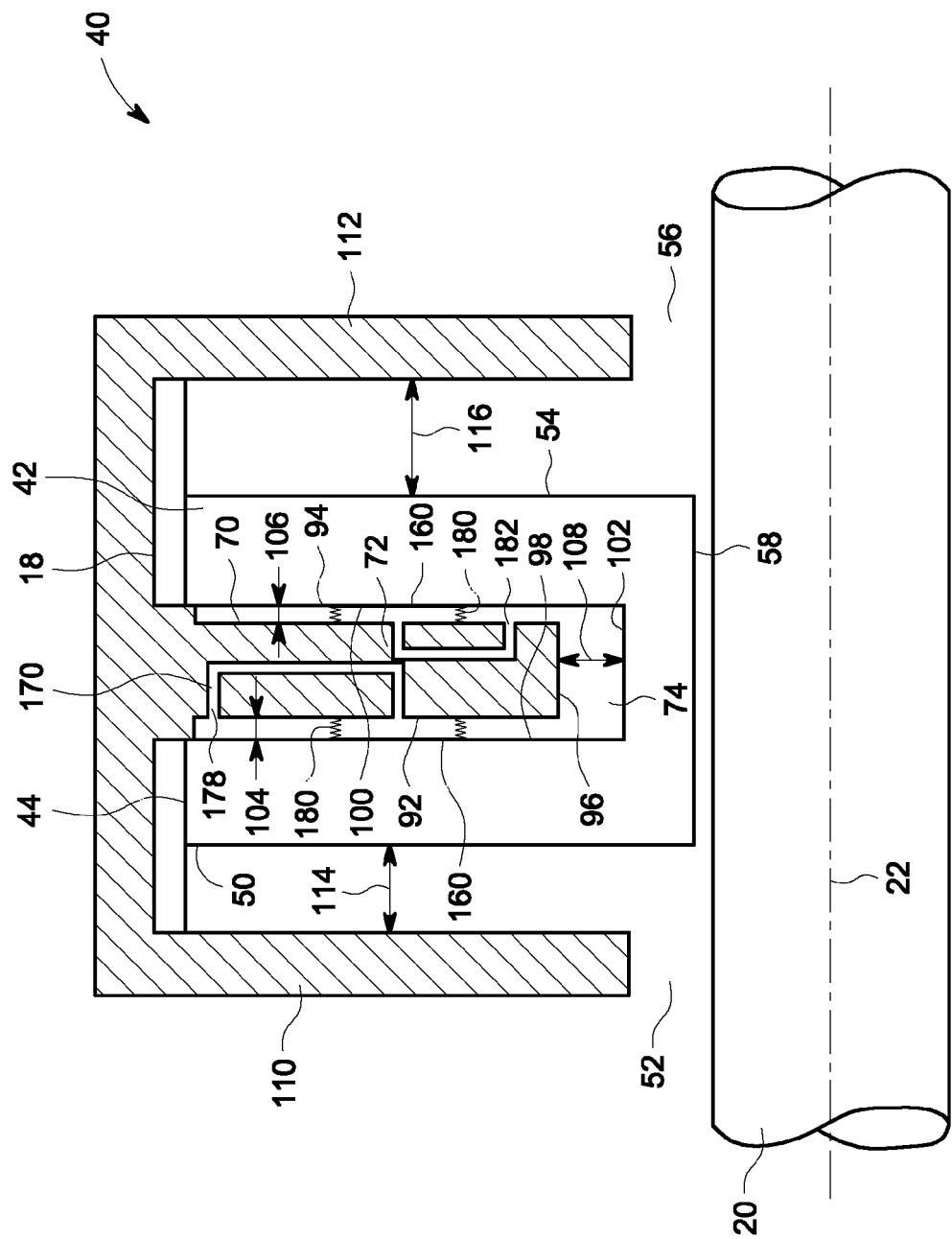
FIG. 16 is an axial cross-sectional view of a seal assembly in accordance with an embodiment of the present disclosure.

FIG. 16 illustrates an axial cross-sectional view of an embodiment of the compliant seal assembly 40. Elements in FIG. 16 in common with those shown in earlier figures are labeled with the same reference numerals. In the illustrated embodiment, the vibration damper plate 160 is pushed against the compliant plate members 42 to dampen vibration of the compliant plate members 42. The vibration damper plate 160 is attached to the annular ring 72 by a bellows 180, which provides flexibility for the vibration damper plate 160 to move axially in response to axial movement of compliant plate members 42. In addition, high-pressure fluid may help to push the vibration damper plate 160 against the compliant plate members 42. Specifically, the pressure 178 in the annular ring front gap 104 may be higher than a pressure near the bellows 180. In addition, a second vibration damper plate 160 and bellows 180 may be included in the back gap 106. A back gap pressure 182 may be higher than a pressure near the bellows 180. In other embodiments, the upstream opening of the high-pressure conduit 170 may be disposed near the high-pressure side 52 similar to the embodiment shown in FIG. 15. The bellows 180 may be made from a flexible material such as, but not limited to, metal. Other aspects of the seal assembly 40 are similar to those described in detail above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A seal assembly for a turbomachine, the turbomachine comprising a stationary housing and a rotor rotatable about an axis, the seal assembly comprising:
 a front ring and a back ring coupled to the stationary housing;
 a plurality of compliant plate members attached to an interior surface of the stationary housing between the front ring and the back ring, the compliant plate members defining a sealing ring between the stationary housing and the rotor, wherein each of the compliant plate members comprises at least one slot therein;
 at least one annular ring attached to the interior surface of the stationary housing and extending radially into the at least one slot in the compliant plate members, the at least one annular ring extending circumferentially through and between a plurality of the compliant plate members such that the at least one annular ring serves as a barrier to at least some axial leakage flow between the compliant plate members; and
 a vibration damper contacting at least two of the front ring, the at least one annular ring, and the compliant plate members to dampen vibration of the plurality of compliant plate members.

2. The seal assembly of claim 1, wherein the vibration damper comprises an arcuate mesh coupled to the at least one annular ring.

3. The seal assembly of claim 2, wherein a porosity of the mesh is greater than approximately 25 percent.

4. The seal assembly of claim 1, wherein a hardness of the vibration damper is less than a hardness of the plurality of compliant plate members.

* * * * *